(12) United States Patent
Havemose

(10) Patent No.: US 6,880,157 B1
(45) Date of Patent: Apr. 12, 2005

(54) SYSTEM AND METHOD OF PROVIDING A VIRTUAL APPLIANCE

(75) Inventor: Allan Havemose, San Jose, CA (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/542,159

(22) Filed: Apr. 4, 2000

Related U.S. Application Data

(63) Continuation-in-part of application No. 09/312,123, filed on May 14, 1999, now Pat. No. 6,757,903.
(60) Provisional application No. 60/127,767, filed on Apr. 5, 1999.

(51) Int. Cl.⁷ .............................................. G06F 3/00
(52) U.S. Cl. ........................ 719/316; 709/201; 705/40
(58) Field of Search .............................. 719/315–317; 709/201, 203, 217–219, 223–226, 229; 705/40

(56) References Cited

U.S. PATENT DOCUMENTS 6,185,609 B1 * 2/2001 Rangarajan et al. ........ 709/219

\* cited by examiner

*Primary Examiner*—Meng-Al T. An
*Assistant Examiner*—George L. Opie
(74) *Attorney, Agent, or Firm*—Jeffrey A. Proehl; Peng Zhu; Suiter West

(57) ABSTRACT

The present invention provides a universal information appliance management system capable of utilizing a distributed object system without regard to whether the appliance is embodied as a hardware device or embodied as software capable of being executed by any other hardware device such that the hardware device is indistinguishable from the software device. In addition, the invention provides a virtual reality interface including a dynamic virtual reality object capable of adapting to interaction by the user. Additionally, the invention provides a system and method for providing distributed functionality over a network including receiving a request to perform a task on a first digital information appliance, the task requiring a resource not included on the first digital information appliance. The digital information appliance locates a second digital information appliance over a network, the second digital information appliance including the resource. The request from the first digital information appliance is transferred to the second digital information appliance so as to enable the task to be performed on the second digital information appliance, and a result of the task performed by the second digital information appliance is returned to the first digital information appliance.

2 Claims, 14 Drawing Sheets

SYSTEM AND METHOD OF PROVIDING A VIRTUAL APPLIANCE

CROSS REFERENCE TO RELATED APPLICATIONS

The present application claims the benefit under 35 U.S.C. § 119(e) of United States Provisional Patent Application Ser. Number 60/127,767 filed on Apr. 5, 1999. Said U.S. Provisional Application 60/127,767 is herein incorporated by reference in its entirety. The present application also is a continuation in part under 35 U.S.C. § 120 of U.S. patent application Ser. No. 09/312,123, filed May 14, 1999, now U.S. Pat. No. 6,757,903. Said U.S. Pat. No. 6,757,903 is herein incorporated by reference in its entirety. The present application also incorporates the following applications by reference in their entirety:

| Attorney Docket Number | Filing Date | Ser. No. |
|---|---|---|
| AMI 99-0002 (P1639US00) | Apr. 4, 2000 | 09/542,559 |
| AMI 99-0003 (P1637US00) | Apr. 4, 2000 | 09/542,716 |
| AMI 99-0004 (P1640US00) | Apr. 4, 2000 | 09/542,743 |
| AMI 99-0006 (P1642US00) | Apr. 4, 2000 | 09/542,714 |

FIELD OF THE INVENTION

The present invention relates generally to the fields of transaction control, and more specifically to methods and apparatus for implementing business process features over a network of digital information appliances, networked computers/devices, and conventional computers.

BACKGROUND OF THE INVENTION

Methods and apparatus for transacting business over a network are old in the art. For example, telephone communications have long been utilized to transact purchases and transfer funds between accounts. Likewise, current cable and satellite television systems allow viewers to order video and audio content paid for via a viewer's credit or debit account information. Additionally, "on-line" purchases of goods and services are becoming common over the INTERNET. However, such methods and apparatus do not allow a buyer and a seller to transact business utilizing a common or universal transaction system.

Digital information appliances (DIA) are electronic devices designed to perform a specific function or group of functions more efficiently than would a conventional computer system. Like computer systems, information appliances may be interconnected with a network such as the INTERNET to provide content and functions which would not be available when the appliances operated independently. Preferably, such network connections are transparent to the user so that the complexity of the underlying computer network is masked. In this manner, information appliances provide advantages in simplicity of operation and computing ease of use to their users.

As the proliferation of digital information appliances accelerates, it will become necessary to develop a standard system architecture and operating environment to facilitate their use and interconnection with each other and other networked devices. Such a system architecture may utilize a distributed object model employing object oriented programming methods. Object oriented programming is a programming paradigm (method) wherein a program is organized as a collection of discrete objects that are self-contained collections of data structures and routines that interact with that data. Such objects encapsulate related data and procedures so as to hide that information by allowing access to the data and procedures only through the object's published interface. Hence changes to the data and or procedures of the object are isolated from other objects. This provides an architecture that is more easily maintained since changes to an object's code does not affect other objects.

Likewise, object oriented programming methods provide for inheritance of an object's characteristics into another class of object. Thus, an object may be derived from a first object to form a second object which "inherits" certain properties of its parent object. This allows for both (1) the formation of subclasses of objects having more specialized features and/or capabilities, and (2) the reuse of individual objects in different programs. Thus, libraries of proven objects may be developed which may be used repeatedly in different applications.

In developing a standard appliance system architecture, it is desirable to allow access to objects in a transparent fashion so that objects created in different programming languages and objects residing on different appliances, network servers, or computer systems that are networked together are accessible to the user without extensive modification of the user's programming code. For computer networks, this capability may be provided by object oriented distributed environments such as the common object request broker architecture (CORBA). Such system architectures are based upon a client-server model, in which object servers provide public interfaces to object-clients that make requests of the object servers. Typically in such systems, the servers are objects consisting of data and associated methods. The object clients obtain access to the object servers by sending them messages which are mediated by the distributed system. When the server object receives the message it invokes the appropriate method and transmits the result back to the object client. The object-client and object server communicate through an Object Request Broker (ORB) which is used to locate the various distributed objects and establish communication between the objects and the client. However, such existing distributed object architectures require that all transactions (communications between client objects and server objects) must pass through an ORB. As a result, the ORB becomes a single failure point which could potentially disable such a system. Further, an ORB typically requires a large amount of memory. Thus, architectures such as CORBA would be unsuitable for "thin" (simple) appliances which have a limited amount of memory.

Consequently, it would be advantageous to develop an information appliance management system employing a standard appliance system architecture. Such an information appliance management system would provide greater fault tolerance than conventional object based architectures, and may be implemented on thin appliances having a limited amount of memory.

Additionally, it may be desirable to provide distributed functionality over a network to enable even "thin" digital information appliances access to functionality previously attainable only on "thick" digital information appliances.

SUMMARY OF THE INVENTION

The present invention provides a universal information appliance management system capable of executing transactions, including financial transactions, across a distributed network.

The invention further provides a digital appliance that is capable of utilizing a distributed object system without regard to whether the appliance is embodied as a hardware device or embodied as software (i.e. a virtual appliance) capable of being executed by any other hardware device such that the hardware device is indistinguishable from the software device. In addition, the invention provides a virtual reality interface including a dynamic virtual reality object capable of adapting to interaction by the user.

Additionally, the invention provides a system and method for providing distributed functionality over a network including receiving a request to perform a task on a first digital information appliance, the task requiring a resource not included on the first digital information appliance. The digital information appliance locates a second digital information appliance over a network, the second digital information appliance including the resource. The request from the first digital information appliance is transferred to the second digital information appliance so as to enable the task to be performed on the second digital information appliance, and a result of the task performed by the second digital information appliance is returned to the first digital information appliance.

It is to be understood that both the forgoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 15A is a simple isometric of a thin digital information appliance (DIA) illustrating resource sharing wherein, for example, the DIA utilizes a hand-writing implementation object and an addition object located and/or operating on another computer or the like;

DETAILED DESCRIPTION OF THE INVENTION

The present invention includes a system architecture and operating environment for digital information appliances (DIAS) which allows for feature and feature enhancements for digital information appliances and the like. A DIA is any electronic device capable of operating on a computer network in batch or real-time. Most DIA's include an I/O, a ROM, and a memory. DIAs include both single feature and multiple feature devices. In a preferred embodiment, DIAs operate in the network of the present environment with general purpose computers and the like (FIG. 1).

Figure 1:
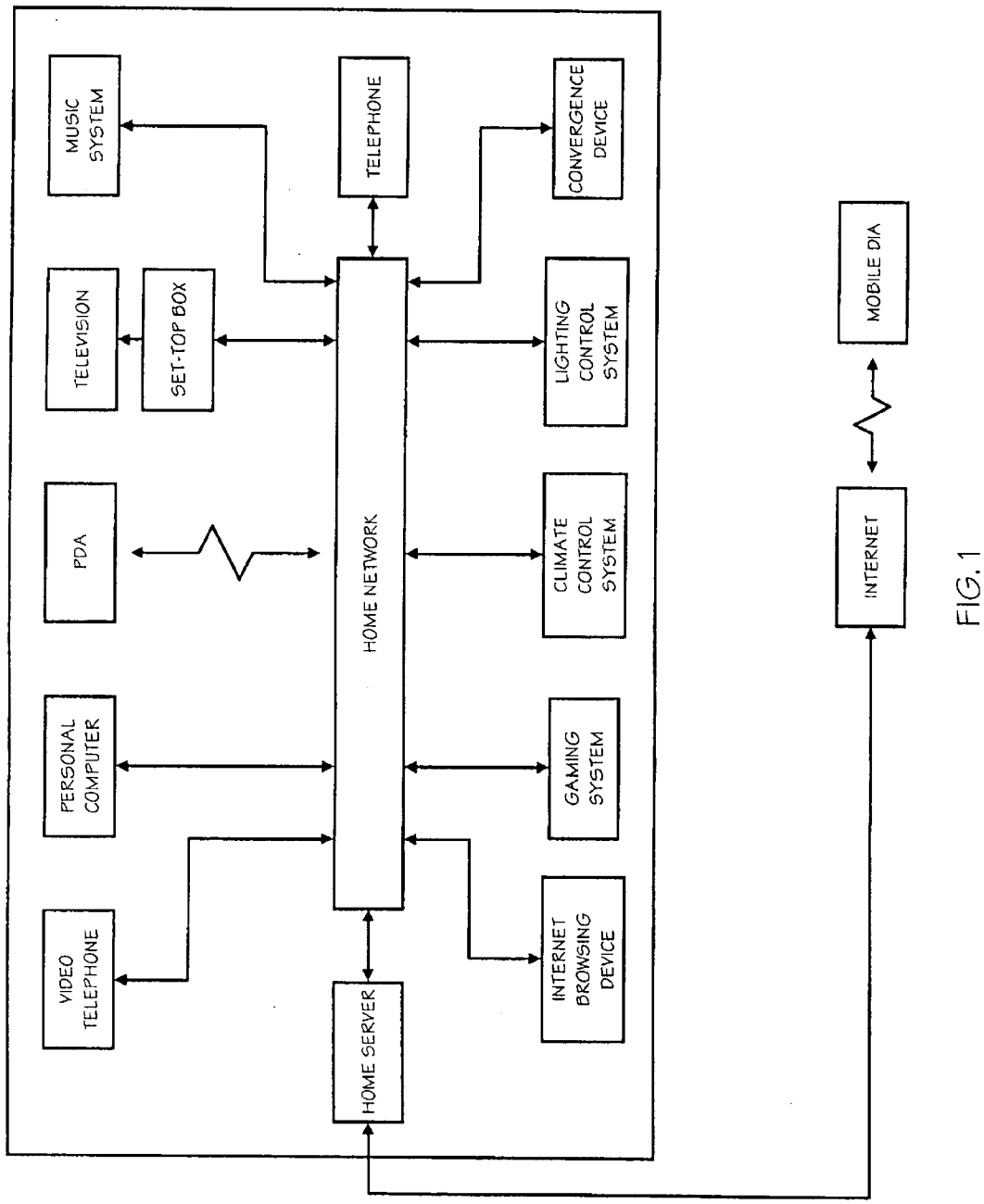
FIG. 1 is a block diagram illustrating a network of information appliances having a local and a global portion operated at least partially by the architecture of the present invention.

Referring generally now to FIGS. 1 through 10, a system architecture and operating environment for digital information appliances (DIAs) which allows for feature and feature enhancements for digital information appliances and the like is shown. A DIA is any electronic device capable of operating on a computer network in batch or real-time. Most DIA's include an I/O, a ROM, and a memory. DIAs include both single feature and multiple feature devices, such as information handling systems. In a preferred embodiment, DIAs operate in the network of the present environment with general purpose computers and the like (FIG. 1).

System Architecture and Operating Environment

To best understand the many novel and innovative features of the universal information appliance management system of the present invention, a discussion of an exemplary underlying system architecture and operating environment is in order. While the patentable features of the present system architecture and operating environment (as claimed herein) will be apparent, other object based or procedural architectures may be utilized to implement the information appliance management system of the present invention.

An object based implementation is described in the preferred embodiment, however those skilled in the art will recognize that the architecture, including a functional hierarchy and an administration function, could be implemented in a procedural implementation without departing from the spirit of the invention.

Figure 2:
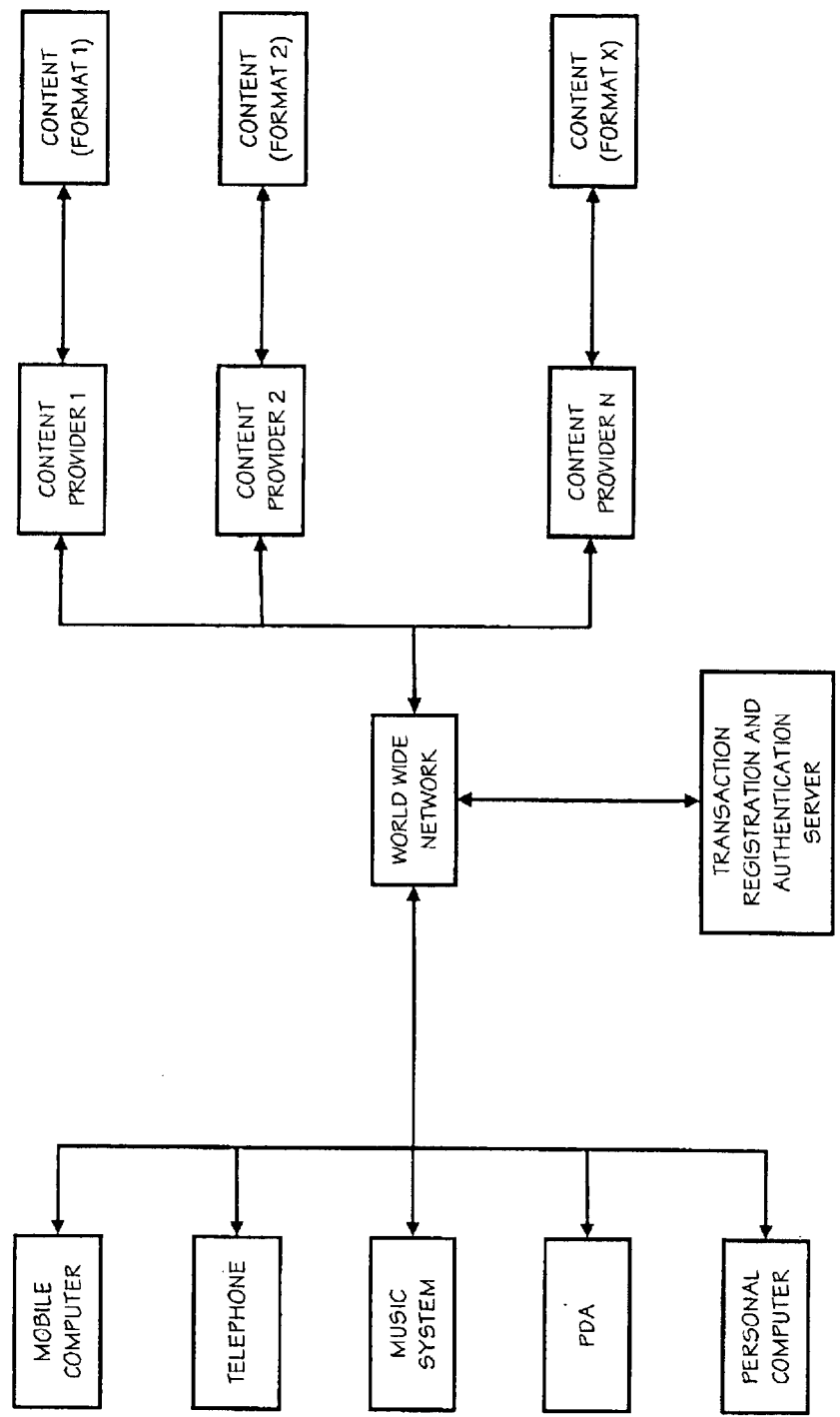
FIG. 2 is a block diagram illustrating content exchange between computers and information appliances over a network at least partially operated by the architecture of the present invention.

The system architecture and operating environment of the present invention (herein after "the architecture") includes an object hierarchy and object administrator. Together the object hierarchy and object administrator provide additional services not offered by the underlying operating system. The architecture of the present invention creates a scalable, object driven software architecture that supports both simple appliances, network computers/devices and general purpose computers such as personal computers, servers, "mainframe" computers, and "super" computers (FIG. 2).

The architecture of the present invention supports the creation of compelling and easy-to-use consumer and desktop user-interfaces. Additionally, networking within the architecture of the present invention is pervasive, i.e., resources on the network behave as local resources and execution is transportable across network boundaries.

Dynamic Base-Objects

The architecture of the present invention also enables efficient development of applications; whether work processors (e.g., word processors), video applications, games or soft appliances. The architecture of the present invention includes dynamic base-objects (DBO). Each DBO implements a defined behavior, but may in addition request and use capabilities of another DBO. DBOs may also provide services to another object such as a DBO requesting another DBO.

Figure 3:
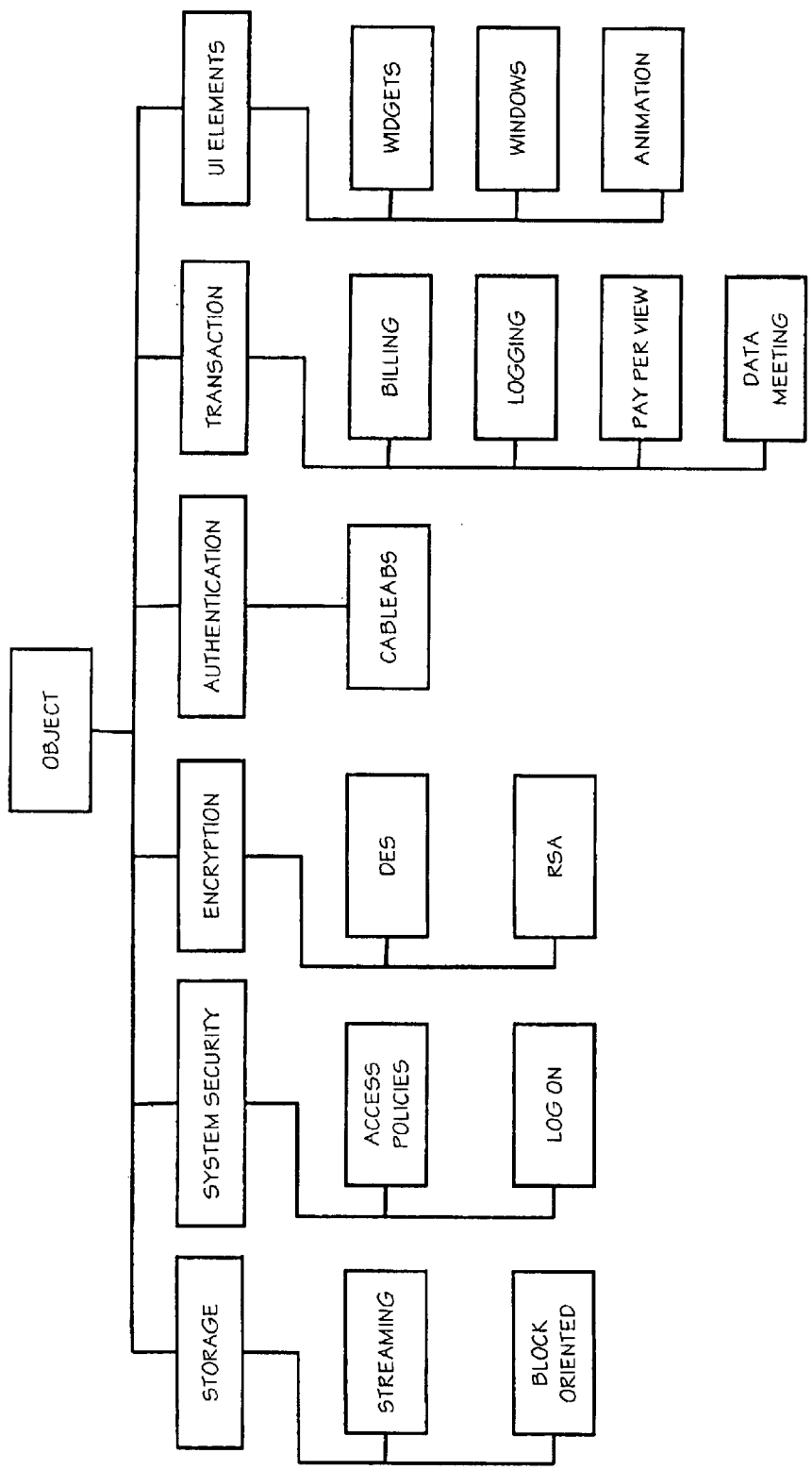
FIG. 3 is a block diagram illustrating the hierarchy of the dynamic objects which operate within the architecture of the scalable, distributed network of the present invention.

In a presently preferred embodiment of the invention a DBO may provide service routines to manage identification and communication with other DBOs. The architecture of the present invention also provides a DBO hierarchy, wherein each DBO or class within the hierarchy specializes in providing one particular type of service. A presently preferred exemplary embodiment of this hierarchy is illustrated in FIG. 3. The hierarchy of the present invention allows for features and capabilities not found in prior art object oriented programming.

Figure 4:
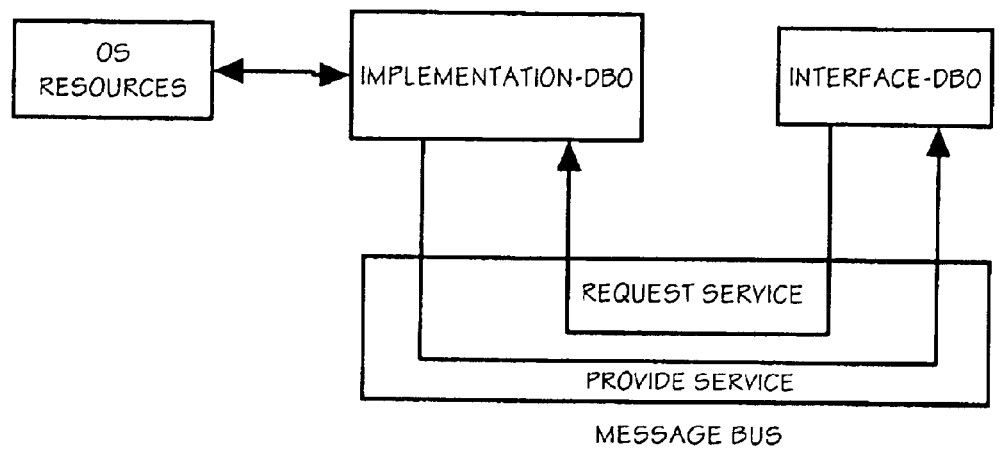
FIG. 4 is a block diagram illustrating the relationship between both implementation-dynamic-base-objects (hereinafter "implementation-DBO") and interface-dynamic-base-objects (hereinafter "interface-DBO") operating within the language neutral architecture of the scalable, distributed network of the present invention.
Figure 5:
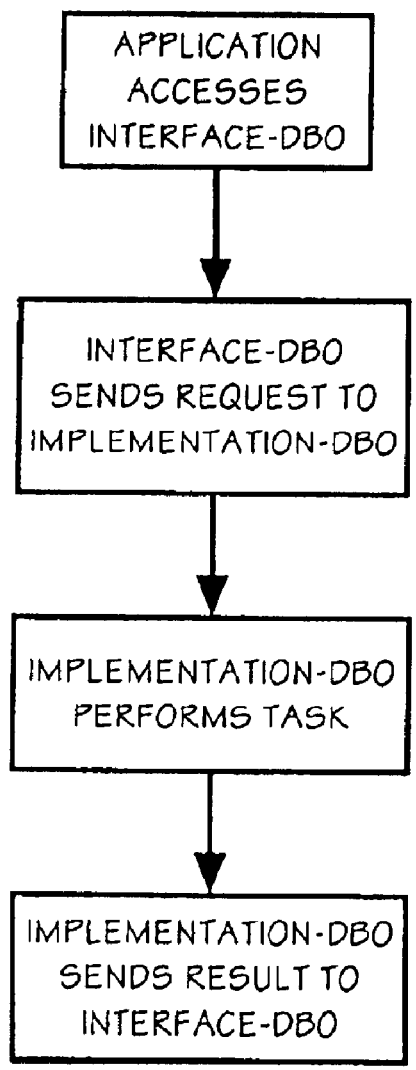
FIG. 5 is a flow diagram illustrating the operation of interface-DBOs and implementation-DBOs for providing architecture features and capabilities within the architecture of the scalable, distributed network of the present invention.

In an exemplary embodiment of the architecture of the present invention, when an application creates a DBO, two DBOs are actually created. These two DBOs are an interface-DBO within the application, and an instance of the real DBO (a/k/a an implementation-DBO). This relationship is best illustrated in FIG. 4. In a preferred embodiment of the invention, each time the application uses the interface-DBO, a message is sent to the implementation-DBO, which carries out the task and returns the result, as shown in FIG. 5. When the application frees the DBO the reverse happens. The implementation-DBO gets a message call to de-allocate its resources and terminate.

In an exemplary embodiment of the present invention the hierarchy of the present invention allows the polymorphic and inheritance features of object oriented programming to be more fully realized. For example, in the present invention polymorphism (which allows a routine in a derived class to be redefined), and inheritance (which allows for the derivation of desired characteristics within a subclass) operate to produce object construction, implementation, and utilization without centralized control, i.e., the object hierarchy of the objects of the present invention manage object construction, implementation, and utilization.

A DBO may be either memory or disk resident. A DBO required for execution is loaded from disk if not present in memory. In a preferred embodiment, DBOs have the following "behavioral" characteristics: (1) capability or feature may be dynamically created, added and changed; (2) other objects including other DBOs may provide a DBO with additional capabilities or features; (3) self checking mechanism with dynamic re-start and re-initialization upon run-time or like failure (4) standardized communication and services interface (e.g., object-to-object, user-to-object, and object-to-user); and (5) fully thread-safe.

The Architecture Administrator

Figure 6A:
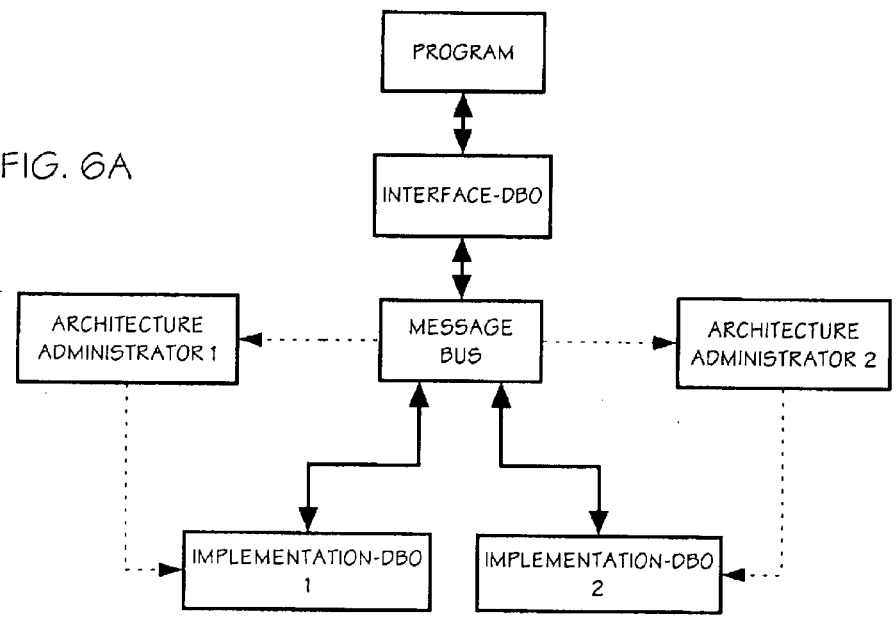
FIG. 6A is a block diagram illustrating architecture administrator (AA) control over the creation and utilization of implementation-DBOs for providing architecture features and capabilities within the architecture of the scalable, distributed network of the present invention.
Figure 6B:
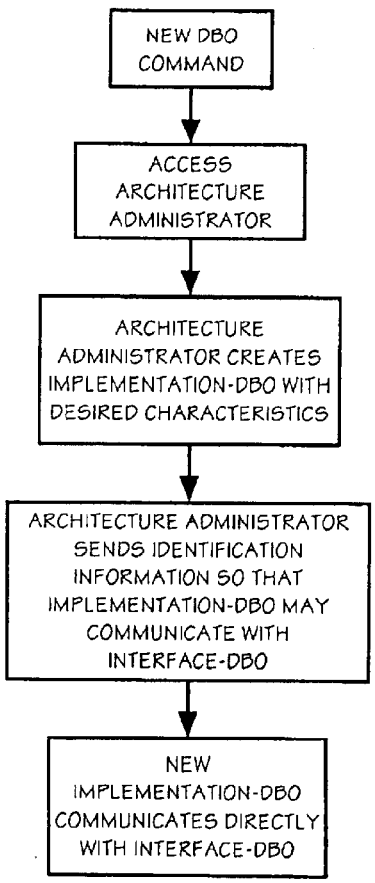
FIG. 6B is a flow diagram illustrating architecture administrator (AA) control over the creation and utilization of implementation-DBOs for providing architecture features and capabilities within the architecture of the scalable, distributed network of the present invention.

In an exemplary embodiment of the architecture of the present invention when an application creates a DBO, two DBOs are actually created (FIGS. 6A and 6B). These two DBOs are an interface-DBO within the application, and an instance of the real DBO (a/k/a an implementation-DBO). This relationship is best illustrated in FIG. 4. For example the application may create a DBO:

DynamicObject *pDObj=new DynamicObject;

The "new" call issues a message call to the architecture administrator (AA), which creates a new DBO with the desired characteristics. The object (DBO) created by the AA also contains the implementation. The AA then replies with "identification information" to the implementation-DBO, such that the interface-DBO and DBO (implementation-DBO) may communicate (FIGS. 6A and 6B).

Figure 7:
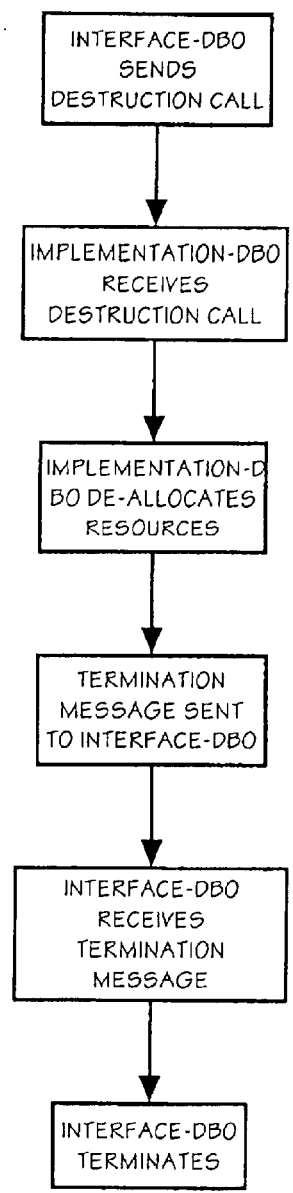
FIG. 7 is a flow diagram illustrating resource reallocation and DBO termination within the architecture of the scalable, distributed network of the present invention.

In a preferred embodiment of the invention, each time the application uses the interface-DBO, a message is sent to the implementation-DBO, which carries out the task and returns the result. When the application frees the DBO the reverse happens. The implementation-DBO gets a message call to de-allocate its resources and terminate. When the interfaced object (IO) receives the termination reply it can then safely terminate as well (FIG. 7).

Thus, the AA serves as the central "launch point" ("dispatcher") for DBOs. While the AA controls launch of DBOs, it is anticipated in a presently preferred embodiment, it will have no further involvement in DBO transactions. This is important, since to do otherwise introduces a "single-point-of-failure" in the system.

When the AA creates a new DBO it may involve loading a disk-based object. The implementation-DBO will often use resources and application programming interfaces ("APIs") provided by the underlying operating system ("OS"). Such OS resource will often be provided through shared libraries.

Figure 8:
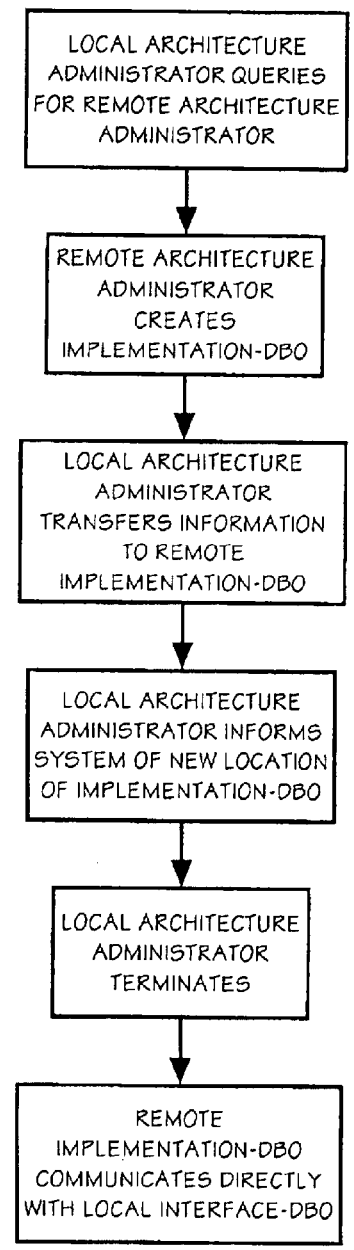
FIG. 8 is a flow diagram illustrating communication between a remote implementation-DBO and a local interface-DBO for providing architecture features and capabilities within the architecture of the scalable, distributed network of the present invention.

This architecture has a number of significant advantages:

1. The application does not embed any knowledge of the DBO; only the interface. This allows DBOs to be updated on "the-fly" such that a DBO may automatically have an application take advantage of the update.
2. The "message bus" can be either interprocess communication ("IPC") within one system or "over the network" for two separate systems (FIG. 8).
3. The application does not need to have direct access to the resources needed to run a particular DBO. This allows for "very thin" network appliances (e.g., where the appliance has little RAM and/or ROM) (FIG. 8).

4. If the DBO is a transaction object, the implementation object may issue another network call to a service provider (e.g., a DBO service provider or DBOSP) with the particulars of the transaction.

5. The AA is involved in creating the implementation object. All further communication happens directly between the interface object and the implementation object (FIGS. 6A and 6B).

DBO Methods

The interface and implementation-DBOs preferably vary in their implementation. Preferably the interface DBO will be implemented as a pure message pass. For example, in a simple function called "ADD" which adds to two integer values and returns the sum:

Interface DynamicObject:

```
Int DynamicObject: :Add(int a, int b)
{
    int      sum;
    string s1 = Encode (a);
    string s2 = Encode (b);
    string reply;
    send_message (gpid_implementation_object,
    dynamic.dynamicobject.add, s1+s2, reply);
    sum = DecodeInt (reply);
    return sum;
}
```

For the implementation object, its min event loop would receive the message and call a function matching the "dynamic.dynamicobject.add" identifier.

Implementation DynamicObject:

```
Int implementation_add (string msg, string answer)
{
    // Extract values from msg
    int    a=DecodeInt (msg);
    int    b=DecodeInt (msg[4]);
    int    sum = a+b;
    answer = Encode (sum);
}
```

From the applications view, life is significantly simpler. Assuming that the application has a function called "SomeFunction( )", it would proceed as follows to use the DynamicObject based Add method implemented herein before:

```
Void SomeFunction( )
{
    DynamicObject   A;
    Int       sum;
    Sum – A.Add (1, 2);
}
```

While more direct methods of addition are available the example string provided several advantages transparently to the application:

1. The calculation is redirected to be performed outside the application (FIG. 8).
2. The redirection may include a network jump, i.e., the implementation may have been running on a different computer.
3. The implementation is shielded from the application, and as long as the results stay the same, the implementation may be changed, optimized and updated without application concern.

DBO Examples

The following examples are provided to those of ordinary skill to further illustrate the power and adaptability of the architecture of the present invention:

1. We want to log onto a network. The logon object encrypts our password, negotiates with the server and finally authenticates our account. It returns with an "OK" signal, that we are now ready to use network resources.

2. We want to watch a pay-per-view movie. The LogOn object works as in 1, the Billing and Logging objects connects and notifies the content provider (e.g., cable, theater, or movie company) we have an account.

Figure 9:
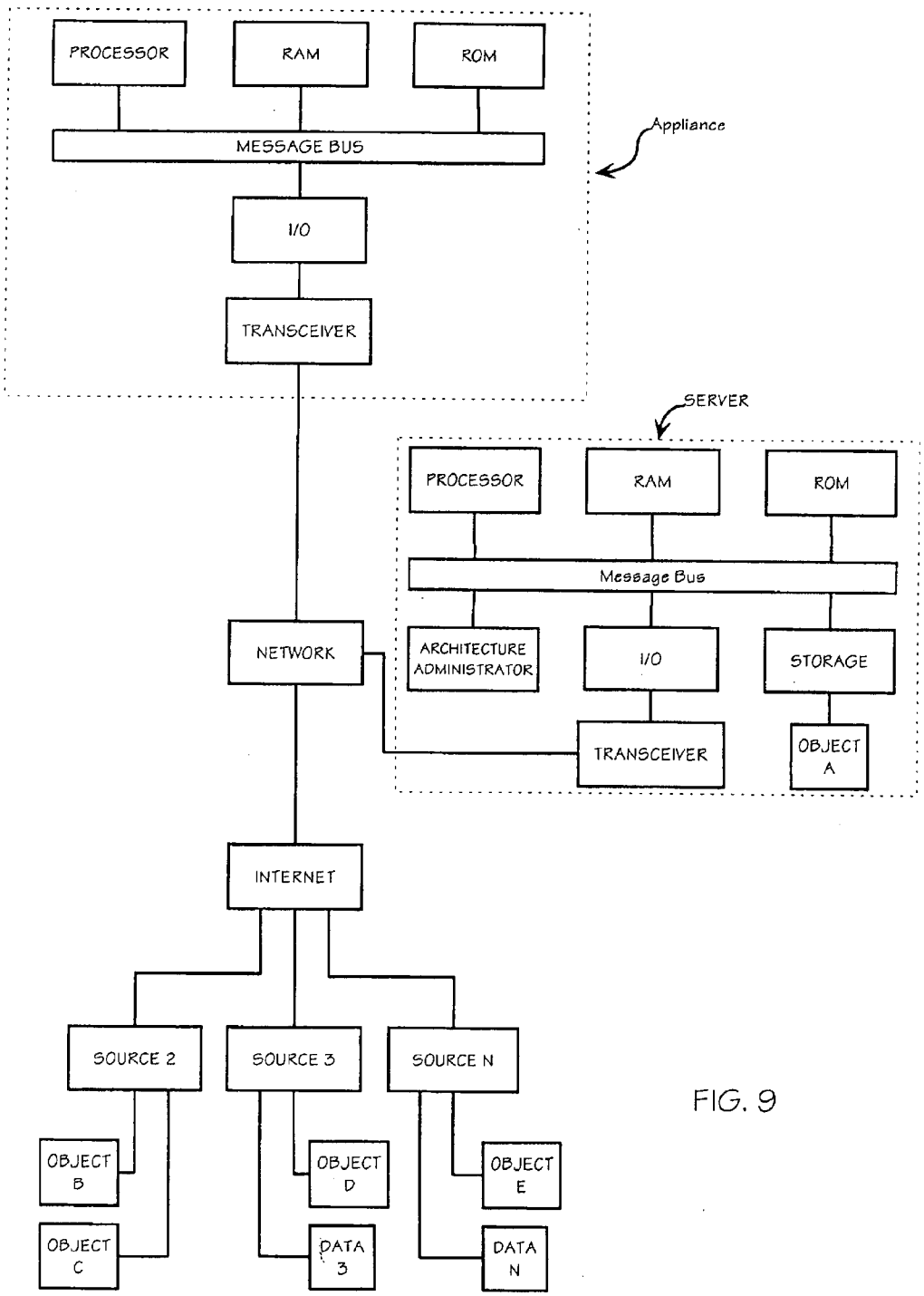
FIG. 9 is a block diagram illustrating scalable resource sharing between, for example, a "thin" information appliance within the architecture of the scalable, distributed network of the present invention.

3. We want to surf the network with our PDA. We load a browser object. Since we only have 1 MB of RAM on our system, the browser object connects to the Netscape browser already running on our PC. Through the transparent networking capabilities of the DBO it seems to us as if the browser is running on the PDA even though its really running on the PC (FIG. 9). This may allow the storage of account, billing, registration information, and the like seamlessly across the network.

Transparent Relocation of DBOs

The interface-DBO serves only as an interface; it contains no state information. Whereas an implementation-DBO contains all state and execution information. Thus, all execution and state information is localized. This total encapsulation allows relocating the execution of a DBO to another system.

Figure 10:
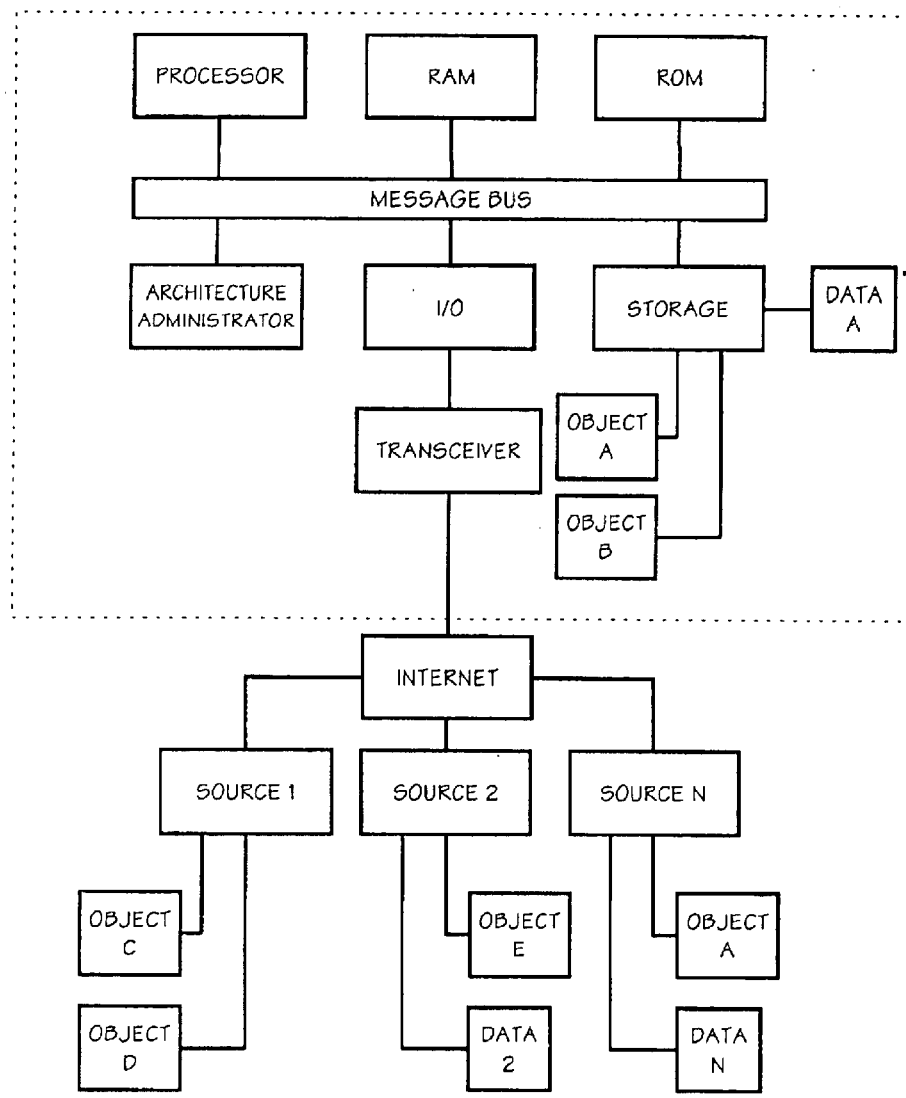
FIG. 10 is a block diagram illustrating scalable resource sharing between, for example, an information appliance within the architecture of the scalable, distributed network of the present invention.

In an exemplary embodiment of the architecture of the invention a local AA may request a remote AA (i.e. running on a different computer) to create an instance of the implementation object, transfer the state and execution information to the remote system, inform the interface of the next server, and terminate itself. Thus, the interface object is not necessarily connected to an implementation object running on a different computer (FIG. 10).

The Architecture Orchestrator and Scriptor

DBOs may be programmed in at least two different ways: (1) with compiled code, as shown herein before; or (2) through scripting language with run-time object invocation. Since DBOs may declare their capabilities at runtime, this allows for dynamic run-time execution of DBOs. An orchestrator or language processor may provide dynamic identification of all methods and properties of all DBOs. The Orchestrator may automatically support any DBO loaded on the system. The Orchestrator may also work with the AA to identify available DBOs and load and execute them as necessary. The Scriptor may be a few lines or a complete application.

Most Script programs will likely be short and tend to focus on the creation and interaction of a modest number of DBOs; for example, small animations, user interface elements and virtual appliances. There are, however, with JAVA® no limitations on the complexity of the Scripts which may employed. The Scriptor is both OS and processor independent. This provides a simple, consistent way to program at both the user-level through the Scriptor and at a program level through DBO interfaces. For example, to spin an object on a desktop, the Scriptor could be as follows:

//- Rotate an object around (0, 0, 0) in its local coordinates
// Until the user clicks on it with a mouse
DynamicObject Icon=FindDynamicObject ("demoobject");
Icon.Rotate (10, 10, 10, on_desktop, WAIT_EVENT);

The two lines do the following: the first line instructs the Orchestrator to find the object, the second line sets the rotation parameters and tells the system to let it run on the desktop (as opposed to its own window), and instructs the object to continue until it receives an external event. If the Rotate method had the last parameter as NULL or equivalent, it would just rotate once and return to the Scriptor; instead it launches a new process and then returns.

The following novel features may be operated using the environment described herein and in particular using the exemplary object based environment.

Virtual Appliances

Figure 11:
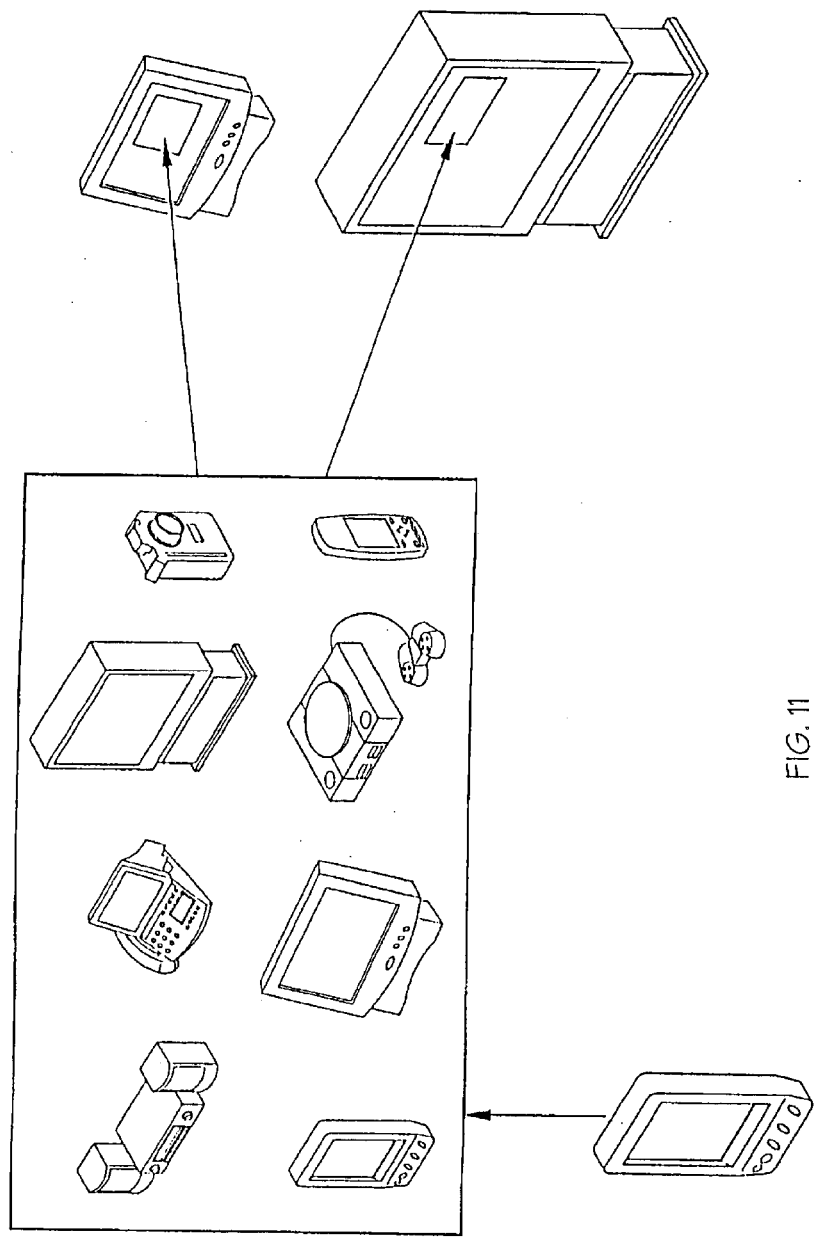
FIG. 11 is a block diagram illustrating virtual appliance operation within a network of the architecture of the present invention.

Functionality need not be limited to a particular device. To increase the usefulness and operational capabilities of digital information appliances, DBOs may be written to add the functionality of a traditional digital information appliance to nontraditional digital information appliances. For example, it may be desirable to add the functionality of a personal scheduler, facsimile machine, music playing system, video gaming device, television, telephone, pager, email, word processor, and the like to other nontraditional digital information appliances. As shown in FIG. 11, the functionality of a video gaming system may be utilized on a high definition digital television, personal digital assistant, microwave oven, or other digital information appliance that may access the implementation-DBO containing the functionality of the desired system.

This is made possible by the unique nature of the present invention. The architecture of the present invention allows for interface-DBOs to be contained on a digital information appliance while allowing the functioning and processing tasks to be performed on other digital information appliances and information handling systems seamlessly by utilizing implementation-DBOs.

In this manner, a "thin" digital information appliance, a digital information appliance with a limited amount of RAM and processor power, an example of which is shown in FIG. 9, may utilize applications requiring a larger quantity of processing power than the digital information appliance is capable of providing on its own. Therefore, providers of virtual appliances may utilize the increased processing power of resources not otherwise accessible to the digital information appliance were it not for the present invention. For example, a remote digital information appliance, such as the personal scheduler as shown in FIG. 11, may utilize an interface-DBO shown as an illustration of the desired appliance. The user, by interacting with the interface-DBO of the desired digital information appliance may utilize the actual digital information appliance to add its functionality to the personal scheduler. The personal scheduler may contain a touch screen so that the user may push buttons and control nobs on the virtual appliance that control the actual appliance through the interface-DBO to implementation-DBO architecture as previously illustrated in FIG. 4. It is important to note that the interface-DBO need not know the true nature of the appliance, whether it be virtual or actual, because as far the interface-DBO is concerned, the implementation-DBO need only return the requested functionality.

Figure 12:
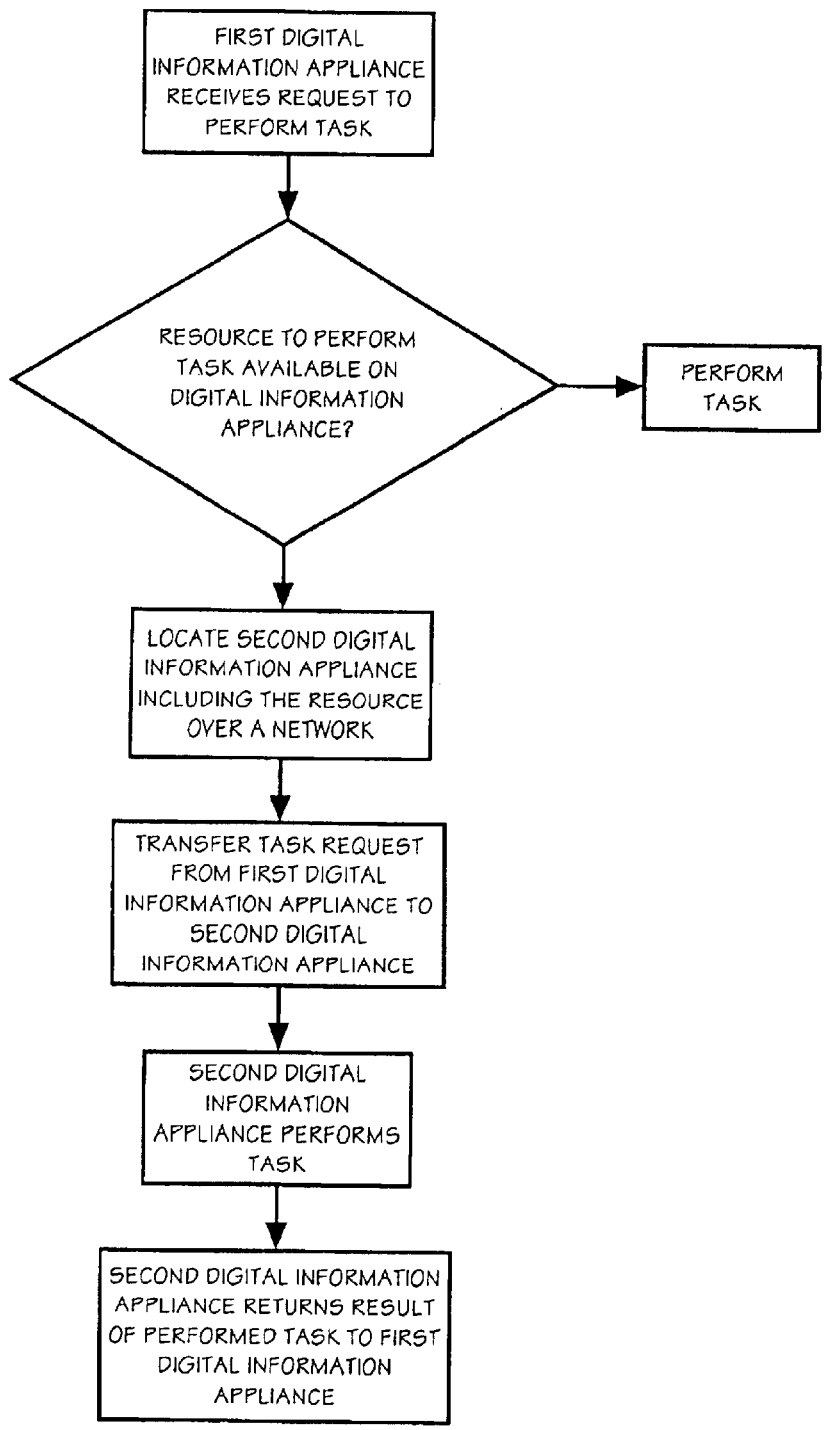
FIG. 12 is a flow diagram depicting an exemplary embodiment of the present invention wherein functionality distributed over a network is accessible to a thin digital information appliance.

Referring now to FIG. 12, an exemplary embodiment of the present invention is shown wherein functionality distributed over a network is accessible to a thin digital information appliance. A first digital information appliance receives a request from a user to perform a task. The digital information appliance then determines if a resource is available to perform the task on the digital information appliance. For example, a user of a "thin" digital information appliance, an example of which is illustrated in FIG. 9, may wish to browse the Internet, perform an extensive numerical calculation, or the like on the digital information appliance. However, the digital information appliance may not include the necessary resource, such as the application needed to run a browser, required processor power, and the like. Thus, the digital information appliance locates the necessary resource to perform the task over a network coupled to the digital information appliance. It may be desirable to utilize an architecture administrator to locate and/or create the necessary resource. The resource may be included on a second digital information appliance, such as a "thick" digital information appliance containing additional processing power and application needed to perform the requested task. Once the resource is located, the digital information appliance may transfer the task request to the second digital information appliance including the resource. The second digital information appliance may then perform the task and return the result to the first digital information appliance. This is made possible by the unique nature of the present invention to seamlessly transfer functionality over a distributed network.

Virtual appliances may even take the place of traditional computer programs and web sites. For example, a provider of virtual appliances may provide a virtual appliance that may be utilized as a spread sheet. Competition and market conditions may encourage the provider to continually update the virtual appliance to compete with other providers. Additionally, the virtual appliance may be updated easily without the problems of packaging and distribution thereby further increasing the cost benefits of the present invention. Previous methods of marketing and distribution may involve creating packages and formulating schemes for distribution. By utilizing the present invention, these costs may be bypassed by the provider thereby increasing the marketability of the virtual appliance. The provider may provide a implementation-DBO running on a bank of information handling systems. In this way, the provider may not only provide the necessary processing power to make the implementation-DBO accessible on thin digital information appliances, but may also change and update the implementation DBO in a more efficient manner over previous methods, such as downloading the updated software over the Internet, mailing updated software, and the like. Thus, the provider may make possible the utilization of the implementation-DBO on a variety of digital information appliances that, before this invention, were incapable of performing these new tasks.

Additionally, it may be desirable to charge for the usage of these virtual appliances. By combining the virtual appliance with an embedded transaction-DBO it may be possible to charge for the utilization of the virtual appliance through a variety of different business models. For example, a provider of a virtual appliance optimized as a scheduler to compute the various transactions undertaken by the user may charge per usage, per amount of time used, per space required on system to store the information, and the like. In this way, providers may arrive at more efficient and competitive billing methods for their virtual appliances.

Figure 13:
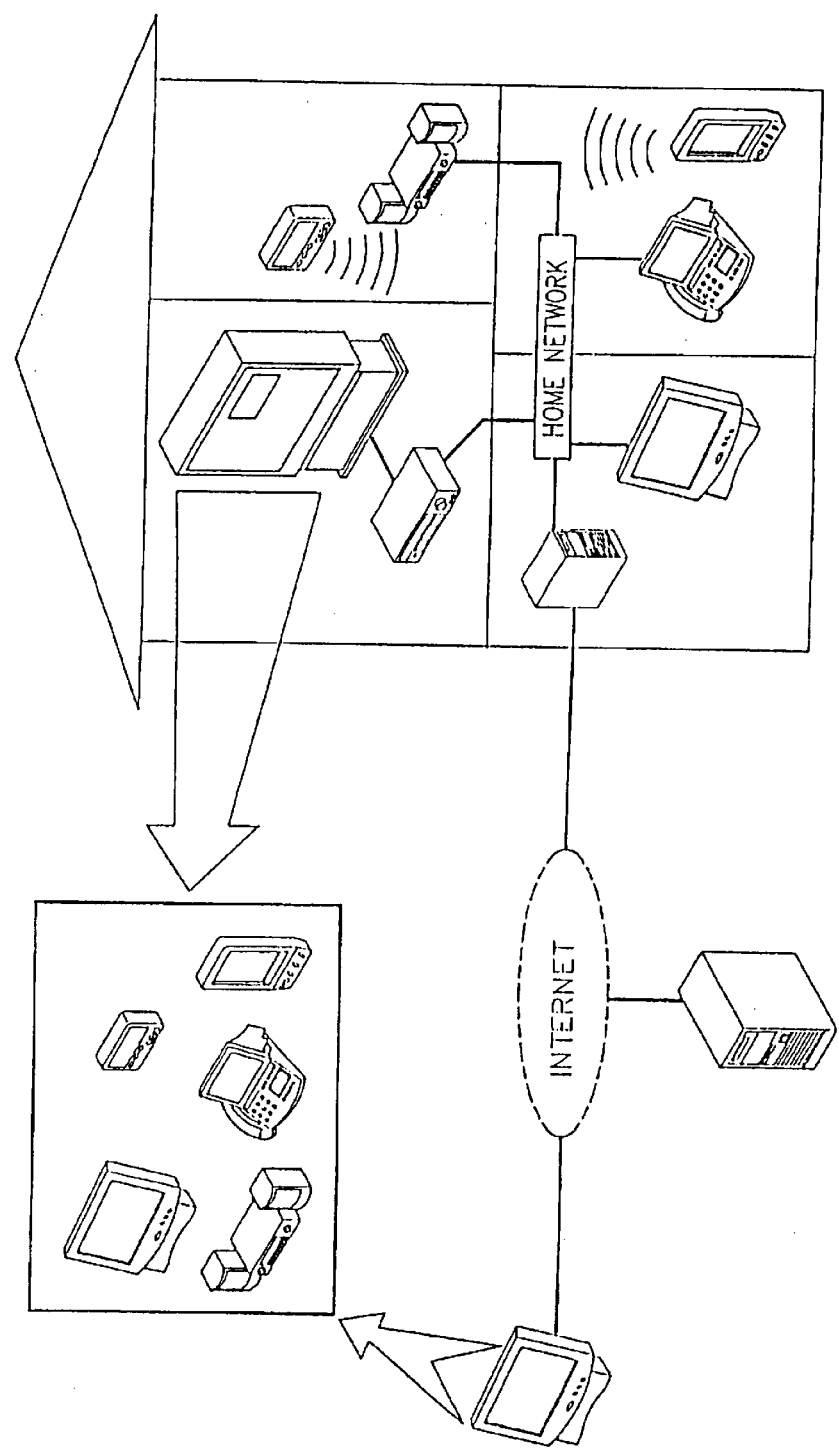
FIG. 13 is a block diagram illustrating resource scaling of virtual appliances within the architecture of the present invention.

Another advantage of the present invention lies in the ability to specialize the virtual appliance for a particular user or set of users. As stated above, a virtual appliance may be utilized on a variety of digital information appliances to provide the functionality of the virtual appliance to that digital information appliance. What may also prove useful is to apply not only the functionality of a virtual appliance to a digital information appliance, but the functionality of a specialized virtual appliance for that user so as to be accessed on a variety of sources. As shown in FIG. 13, a variety of digital information appliances are shown such as pagers, personal digital assistants, televisions, music players, and the like may be utilized in a home network. With the use of an interface-DBO on a digital information assistant operating outside of the network, the digital information appliance may access implementation-DBOs so as to provide the functionality of the home digital information appliances to the remote digital information appliance. Additionally, the remote digital information appliance may also control and utilize the implementation-DBOs operating on the home network. Therefore, the remote digital information appliance may then have the ability to play music, run video games, send and receive faxes, play television programs, and perform other functions, and the like that the digital information appliance would not be able to perform on its own. Even on "thick" digital information appliances, those appliance containing a large amount of processing and memory power, an example of which is shown in FIG. 10, this increased functionality may enable the network to act as one continuous and seamless source of resources, such as functionality, data storage, and the like. This enables the collection of digital information appliances, virtual information appliances, DBOs, and the like, to be utilized anywhere in the system as one resource containing the functionality of its component parts.

Dynamic Virtual Objects

To adapt to user interaction, the Architecture Administrator (AA) may create dynamic virtual objects that optimize the digital information appliance based on user interaction. As a digital information appliance is utilized, it may be called upon to perform a variety of tasks. It might be preferable to optimize a digital information appliance for implementation of preferred tasks. For example, these tasks may be monitored by a dynamic virtual object so as to create and implement a variety of DBOs based on the user's past usage, so that the digital information appliance may be optimized for predicted future usage based on the user's needs. For instance, a user might utilize a digital information appliance for mainly mathematical and other number intensive functions. The digital information appliance may then load and implement a variety of DBOs related to number intensive functions so that the digital information appliance may operate more efficiently. In this example these number related DBOs may be identified by the digital information appliance, with the implementation object running on a machine optimized for mathematical functions.

Figure 14:
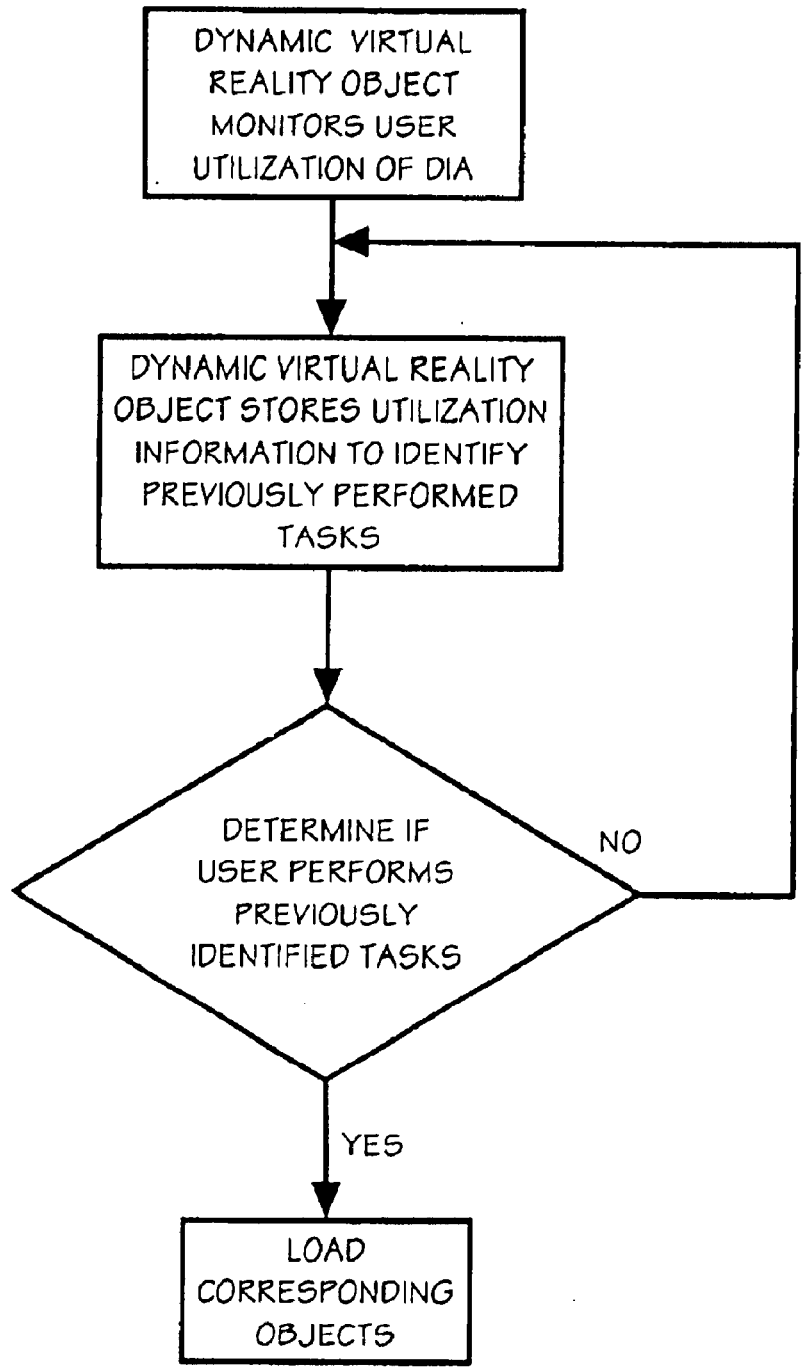
FIG. 14 is a flow diagram illustrating a dynamic virtual reality object which adapts to user interaction based on past user interaction within the architecture of the present invention.

Referring now to FIG. 14, a method of utilizing a dynamic virtual object is shown. A dynamic virtual object monitors the utilization of a digital information appliance. The dynamic virtual object then stores utilization information to identify previously performed tasks. For instance, the dynamic virtual object may store the implementation object location of frequently performed tasks so that a new implementation object need not be found or created by the Architecture Administrator. In this way, the program may eliminate an operational step that may be time and resource consuming. The dynamic virtual object may then monitor the current usage of the user to detect if the user is performing a task previously identified by the dynamic virtual object. If this task is identifiable, the dynamic virtual object may then load previously identified DBOs related to that usage. Such a digital information appliance may be optimized by having a task identified so as to be ready for immediate implementation. In this way, the digital information appliance may anticipate the needs of the user thereby operating more efficiently. Furthermore, is may be preferable to utilize a dynamic virtual object to optimize and personalize the usage of a particular user when utilizing a variety of digital information appliances. For example, the dynamic virtual object may reside on a home network. Usage of all the digital information appliances on the network may be monitored so that utilization on one digital information appliance may be used to optimize future usage on another digital information appliance. In this way, a home network may be specialized and optimized for a particular user or group of users. Additionally, the current usage may be monitored by the dynamic virtual object so that the future usage may be predicted by that usage, as described below.

Figure 15A:
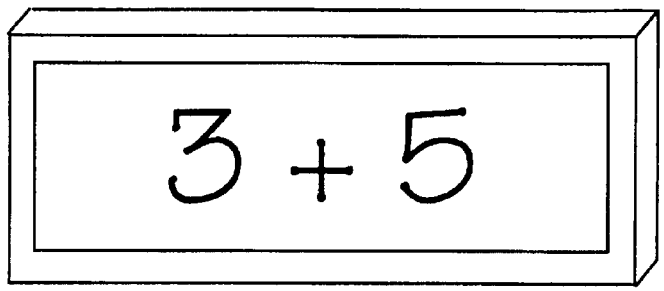
Figure 15B:
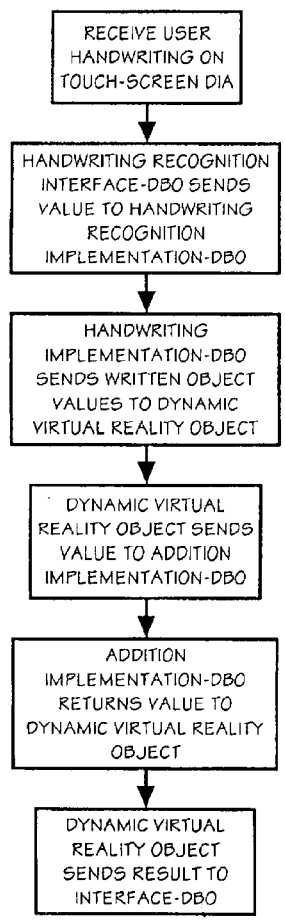
FIG. 15B is a flow diagram illustrating program logic for FIG. 15A.

Referring now to FIGS. 15A and 15B, another exemplary embodiment of a dynamic virtual object is shown. In this embodiment, a digital information appliance is configured for receiving and interpreting handwritten input, as shown in FIG. 15A. The digital information appliance in this example receives handwritten indicia on a touch-sensitive surface. The digital information appliance may then utilize a handwriting recognition interface object to send the value to a handwriting implementation object. The handwriting implementation object interprets the data, and returns the data to a dynamic object. The dynamic object may then recognize that an addition task is required. In this instance, the dynamic virtual reality object may recognize an addition sign and predict that a summation of the two values is desired, as shown in FIG. 15A. The dynamic object may then access an addition implementation object to compute the value. The addition implementation object then returns the value to the dynamic virtual object. The dynamic virtual object stores the usage information so that future usage may be performed more efficiently. For example, the dynamic virtual object may form a handwriting addition object that determines the sum of entered numbers in one implementation step. Or, the dynamic virtual object may simply load an addition implementation object whenever the handwriting implementation object is utilized so as to prepare the digital information appliance for possible future actions by the user.

Figure 16:
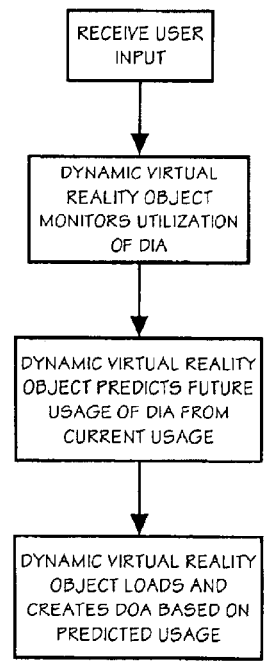
FIG. 16 is a flow diagram illustrating a dynamic virtual reality object which adapts to present or current user interaction within the architecture of the present invention.

Additionally, it may be preferable to predict future usage based upon the user's current needs. For instance, a dynamic virtual object may predict which future objects may be desired to be utilized by the digital information appliance from the types and combination of objects currently in use on the system (FIG. 16). For example, if a DBO was utilized to turn on the kitchen lights in the morning and another DBO was utilized to start a coffee maker, the dynamic virtual object may then find and load a variety of objects having to do with kitchen usage, and more particularly with kitchen usage in the morning. For instance, the dynamic virtual object may then load morning programming into a television, such as the weather channel and morning talk shows, as well as load information regarding optimal toaster settings for toasting bagels, based upon the combination of turning on the lights in the kitchen in the morning and making coffee.

Thus, there has been described an object driven software architecture and several process features which together provide for at least all of the advantages stated herein. Although the invention has been described with a certain degree of particularity, it should be recognized that elements thereof may be altered by persons skilled in the art without departing from the spirit and scope of the invention. It is believed that the virtual appliance of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for providing distributed functionality over a network, comprising:

receiving a request to perform a task on a first digital information appliance, the task requiring a resource not included on the first digital information appliance;

locating a second digital information appliance over a network, the second digital information appliance including the resource;

transferring the request from the first digital information appliance to the second digital information appliance so as to enable the task to be performed on the second digital information appliance; and returning a result of the performed task by the second digital information appliance to the first digital information appliance;

wherein the request is received by a first program object on the first digital information appliance and the task is performed by a second program object on the second digital information appliance, and wherein locating includes utilizing an architecture administrator, the architecture administrator capable of at least one of finding and creating an instance of the second program object;

wherein the architecture administrator only controls launch of the first program object and the second program object;

wherein the request includes a transaction object, the transaction object suitable for supplying billing information related to the performed task;

wherein the transaction object comprises a dynamic base object, the dynamic base object including a transaction interface dynamic base object and a transaction implementation dynamic base object; and wherein the transaction interface dynamic base object is embedded in a request dynamic base object and the transaction implementation dynamic base object resides on a third digital information appliance.

2. A system for providing distributed functionality over a network, comprising:

a first digital information appliance; and a second digital information appliance coupled to the first digital information appliance over the network;

wherein the first digital information appliance receives a request to perform a task requiring a resource not included on the first digital information appliance, locating the second digital information appliance over the network, the second digital information appliance including the resource;

transferring the request from the first digital information appliance to the second digital information appliance so as to enable the task to be performed on the second digital information appliance; and returning a result of the performed task by the second digital information appliance to the first digital information appliance;

wherein the request is received by a first program object on the first digital information appliance and the task is performed by a second program object on the second digital information appliance, and wherein locating includes utilizing an architecture administrator, the architecture administrator capable of at least one of finding and creating an instance of the second program object;

wherein the architecture administrator only controls launch of the first program object and the second program object;

wherein the request includes a transaction object, the transaction object suitable for supplying billing information related to the performed task;

wherein the transaction object comprises a dynamic base object, the dynamic base object including a transaction interface dynamic base object and a transaction implementation dynamic base object; and wherein the transaction interface dynamic base object is embedded in a request dynamic base object and the transaction implementation dynamic base object resides on a third digital information appliance.

* * * * *